United States Patent [19]

Ohkawa et al.

[11] Patent Number: 5,236,967
[45] Date of Patent: Aug. 17, 1993

[54] OPTICAL MOLDING RESIN COMPOSITION COMPRISING POLYTHIOL-POLYENE COMPOUNDS

[75] Inventors: Kazuo Ohkawa; Seiichi Saito, both of Tokyo, Japan

[73] Assignee: Asahi Denka Kogyo K.K., Tokyo, Japan

[21] Appl. No.: 837,311

[22] Filed: Feb. 18, 1992

Related U.S. Application Data

[63] Continuation-in-part of Ser. No. 632,358, Dec. 21, 1990, abandoned.

[30] Foreign Application Priority Data

Jan. 12, 1990 [JP] Japan ................................. 2-4935
Jan. 11, 1991 [EP] European Pat. Off. ........... 91-300203

[51] Int. Cl.$^5$ .......................... C08F 2/50; C08G 75/04
[52] U.S. Cl. ........................................ 522/32; 522/180;
522/97; 522/104; 522/100; 522/37; 522/14;
522/46; 522/44; 522/43; 522/42; 522/53;
522/57; 522/62; 522/60; 528/376; 528/392
[58] Field of Search ................. 522/180, 97, 104, 100,
522/32, 37, 14, 46, 44, 43, 42, 53, 57, 62, 60;
528/376, 392

[56] References Cited

U.S. PATENT DOCUMENTS 3,701,721 10/1972 Lard ................................. 204/159.16
3,908,039 9/1975 Guthrie et al. ...................... 428/419
4,139,385 2/1979 Crivello .
4,272,586 6/1981 Ando et al. .......................... 428/419
4,391,686 7/1983 Miller et al. ..................... 204/159.15

FOREIGN PATENT DOCUMENTS 0075538 3/1983 European Pat. Off. ............ 522/180
225998 8/1985 Fed. Rep. of Germany .

OTHER PUBLICATIONS

WPIL, File Supplier, AN=84-161460, Derwent Abstract for Japan Patent No. 59/86001.
WPIL, File Supplier, AN=84-162083, Derwent Abstract for Japan Patent No. 59/87123.
WPIL, File Supplier, AN=84-162086, Derwent Abstract for Japan Patent No. 59/87126.
WPIL, FIle Supplier, AN=87-119192, Derwent Abstract for Japan Patent No. 62/62831.

*Primary Examiner*—Susan Berman
*Attorney, Agent, or Firm*—Flynn, Thiel, Boutell & Tanis

[57] ABSTRACT

An optical molding composition is used for casting and does not cause irritation to the skin or possess a bad smell. This composition comprises 1. an actinic radiation-curable, radical-polymerizable organic compound comprising
   (1) one or more polythiol compounds and
   (2) one or more polyene compounds each having at least two actinic radiation-reactive carbon-to-carbon double bonds in the molecule, and
2. an actinic radiation-sensitive radical polymerization initiator.

4 Claims, No Drawings

OPTICAL MOLDING RESIN COMPOSITION COMPRISING POLYTHIOL-POLYENE COMPOUNDS

This application is a continuation-in-part application of U.S. patent application Ser. No. 07/632 358, filed Dec. 21, 1990, now abandoned.

FIELD OF INDUSTRIAL APPLICATION

The present invention relates to an optical molding resin composition curable by actinic radiation.

PRIOR ART

A hand-made model or a model made by NC (numerical-control: a system for the automatic control of machine tools in which control is conducted by command signals and based on numerical information) cutting with an NC milling machine is usually used as a model having a shape corresponding to the shape of an intended product and is necessary for the production of its mold or a model for profile control in cutting work or for an electrode for diesinking electrical discharge machining. However, the production of the model by hand requires a large amount of labor and skill. The NC cutting necessitates a complicated work program including the exchanging of the cutter or the shape of the edge thereof, as well as countermeasures for abrasion. Another problem with NC cutting is that finishing is often necessary in order to remove differences in the levels formed on the worked surface. It has been desired to develop a new process which solves the problems of the conventional techniques and produces models of complicated shapes which can be used in the production of molds, profile control or diesinking electrical discharge machining and various articles of fixed form by an optical molding process.

Various properties are required of the optical molding resins such as excellent curing sensitivity to actinic radiation, high resolution to curing by actinic radiation, high ultraviolet transmission after curing, high γ-characters, small volume reduction upon curing, high mechanical strength of the cured product, excellent self-adhesion and excellent curing properties in an oxygen atmosphere.

Examples of actinic radiation curable organic compounds include modified polyurethane methacrylate, oligoester acrylate, urethane acrylate, epoxy acrylate, photosensitive polyimides, and aminoalkyds described in Japanese Patent Laid-Open Nos. 247515/1985 and 237173/1989. The dimensional accuracy of a molding produced from these compounds is low since the curing thereof by actinic radiation is inadequate due to its curing inhibition by oxygen in the air and, also, since its shrinkage upon curing is high. Thus, these compounds are not very suitable for use as a material for optical molding resin compositions.

In handling the acrylate resins, they have a problem in that their ability to cause skin irritation and their odor become serious when a polyfunctional monomer or a diluent is used in order to improve their reactivity in air.

SUMMARY OF THE INVENTION

After intensive investigations of photosensitive resins having properties of optical molding resins, the inventors have completed the present invention.

An object of the present invention is to provide a resin composition suitable for use in an optical molding system with actinic radiation.

The optical molding resin composition of the present invention is characterized by comprising:

1. an actinic radiation-curable, radical-polymerizable organic compound comprising (1) one or more polythiol compounds and (2) one or more polyene compounds, each having at least two actinic radiation-reactive carbon-to-carbon double bonds in the molecule, and
2. an actinic radiation-sensitive radical polymerization initiator.

The polythiol compounds constituting the actinic radiation-curable, radical-polymerizable organic compound to be used in the present invention include those of the following general formula (1):

$$A-(SH)_q \qquad (1)$$

wherein

A represents a q-valent organic residue free from an unsaturated bond reactive with an SH group, and q represents an integer of at least 2, which have a molecular weight of 80 to 10,000 and a viscosity at 50° C. of nearly 0 to 10,000 P. Preferred examples of the polythiol compounds include those synthesized by the esterification of thioglycolic acid, α-mercaptopropionic acid or β-mercaptopropionic acid with a polyhydric alcohol; aliphatic and aromatic polythiols such as ethanedithiol, propanedithiol, hexamethylenedithiol and xylylenedithiol; polythiols obtained by replacing a halogen atom of an alcohol/epihalohydrin adduct with a mercaptan group; and reaction products of a polyepoxy compound with hydrogen sulfide. The polyhydric alcohols which can be subjected to esterification with the above-described thioglycolic acid and mercaptopropionic acid include ethylene glycol, diethylene glycol, triethylene glycol, polyethylene glycol, propylene glycol, dipropylene glycol, polypropylene glycol, 1,3-butanediol, 1,4-butanediol, 1,6-hexanediol, neopentyl glycol, bisphenol A, hydrogenated bisphenol A, bisphenol A / ethylene oxide adduct, bisphenol A / propylene oxide adduct, thiodiethanol, trimethylolpropane, glycerol, triethanolamine, pentaerythritol, dipentaerythritol, sorbitol, hydroquinone, pyrogallol, xylylene glycol, 4,4'-dihydroxydiphenylmethane, trishydroxyethyl isocyanurate, and bishydroxyethylhydantoin.

These polythiol compounds can be used singly or in the form of a mixture of two or more of them.

The polyene compounds which constitute the actinic radiation-curable, radical-polymerizable organic compounds usable in the present invention are preferably those having actinic radiation-reactive carbon-to-carbon double bonds in their molecule, such as polybutadiene, polyisoprene, allyl ether resin, allyl ester resin, allylurethane resin, acrylate resin, methacrylate resin, vinyl ether resin, vinyl thioether resin, N-vinyl compound, unsaturated polyester resin, and vinylcloacetal resin, among which, the acrylate resins having at least two actinic radiation-reactive carbon-to-carbon double bonds in the molecule can be used as particularly preferred polyene compounds constituting the optical molding resin composition of the present invention.

The acrylate resins include epoxy acrylate, urethane acrylate, polyester acrylate, polyether acrylate and alcohol acrylate.

Preferred epoxy acrylates are those produced by reacting a known aromatic epoxy resin, alicyclic epoxy resin, aliphatic epoxy resin or the like with acrylic acid. Among these epoxy acrylates, particularly preferred are aromatic epoxy resin acrylates which are obtained by reacting a polyglycidyl ether of a polyhydric phenol having at least one aromatic nucleus or its alkylene oxide adduct with acrylic acid. Examples of them include acrylates obtained by reacting a glycidyl ether (formed by reacting bisphenol A or its alkylene oxide adduct with epichlorohydrin) with acrylic acid and acrylates obtained by reacting an epoxy novolak resin with acrylic acid.

Preferred urethane acrylates are those obtained by reacting one or more hydroxyl group-containing polyesters or hydroxyl group-containing polyethers with a hydroxyl group-containing acrylic ester and an isocyanate and also those obtained by reacting a hydroxyl group-containing acrylic ester with an isocyanate.

Preferred hydroxyl group-containing polyesters usable herein are those obtained by the esterification of one or more polyhydric alcohols or alkylene oxide adduct(s) thereof with one or more polybasic acids. Examples of the polyhydric alcohols include 1,3-butanediol, 1,4-butanediol, 1,6-hexanediol, ethylene glycol, diethylene glycol, triethylene glycol, neopentyl glycol, polyethylene glycol, polypropylene glycol, trimethylolpropane, pentaerythritol, dipentaerythritol, bisphenol A, hydrogenated bisphenol A, thiodiethanol, glycerol, triethanolamine, sorbitol, hydroquinone, pyrogallol, xylene glycol, 4,4'-dihydroxydiphenylmethane, trishydroxyethyl isocyanurate, and bishydroxyethylhydantoin. Examples of the polybasic acids include succinic, adipic, sebacic, phthalic, hexahydrophthalic, trimellitic and pyromellitic acids.

Preferred hydroxyl group-containing polyethers are those obtained by adding one or more alkylene oxides to a polyhydric alcohol. Examples of the polyhydric alcohols include 1,3-butanediol, 1,4-butanediol, 1,6-hexanediol, ethylene glycol, diethylene glycol, triethylene glycol, neopentyl glycol, polyethylene glycol, polypropylene glycol, trimethylolpropane, pentaerythritol, dipentaerythritol, bisphenol A, hydrogenated bisphenol A, thiodiethanol, glycerol, triethanolamine, sorbitol, hydroquinone, pyrogallol, xylylene glycol, 4,4'-dihydroxYdiphenylmethane, trishydroxyethyl isocyanurate, and bishydroxyethylhydantoin. Examples of the alkylene oxides include ethylene oxide and propylene oxide.

Preferred hydroxyl group-containing acrylic esters include those obtained by the esterification of a polyhydric alcohol with acrylic acid. Examples of the polyhydric alcohol include 1,3-butanediol, 1,4-butanediol, 1,6-hexanediol, ethylene glycol, diethylene glycol, triethylene glycol, neopentyl glycol, polyethylene glycol, polypropylene glycol, trimethylolpropane, pentaerythritol, dipentaerythritol, bisphenol A, hydrogenated bisphenol A, thiodiethanol, glycerol, triethanolamine, sorbitol, hydroquinone, pyrogallol, xylylene glycol, 4,4'-dihydroxydiphenylmethane, trishydroxyethyl isocyanurate and bishydroxyethylhydantoin. Among the hydroxyl group-containing acrylic esters, particularly preferred are those obtained by the esterification of an aliphatic polyhydric alcohol with acrylic acid. They include 2-hydroxyethyl acrylate and pentaerythritol triacrylate.

Examples of the isocyanates include monomeric polyisocyanate compounds such as dicyclohexylmethane 4,4'-diisocyanate, tolylene diisocyanate, diphenylmethane 4,4'-diisocyanate, xylylene diisocyanate, isophorone diisocyanate and hexamethylene diisocyanate as well as trimers of tolylene diisocyanate and isophorone diisocyanate.

Preferred polyester acrylates are those obtained by reacting a hydroxyl group-containing polyester with acrylic acid.

Preferred hydroxyl group-containing polyesters usable herein are those obtained by the esterification of one or more polyhydric alcohols with one or more monobasic acids and/or polybasic acids and a phenol. Examples of the polyhydric alcohols include 1,3-butanediol, 1,4-butanediol, 1,6-hexanediol, ethylene glycol, diethylene glycol, triethylene glycol, neopentyl glycol, polyethylene glycol, polypropylene glycol, trimethylolpropane, pentaerythritol, dipentaerythritol, bisphenol A, hydrogenated bisphenol A, thiodiethanol, glycerol, triethanolamine, sorbitol, hydroquinone, pyrogallol, xylylene glycol, 4,4'-dihydroxydiphenylmethane, trishydroxyethyl isocyanurate, and bishydroxyethylhydantoin. Examples of the monobasic acids include formic, acetic, butylcarboxylic and benzoic acids. Examples of the polybasic acids include succinic, adipic, sebacic, phthalic, hexahydrophthalic, trimellitic and pyromellitic acids. Examples of the phenols include phenol and p-nonylphenol.

Preferred polyether acrylates are those obtained by reacting a hydroxyl group-containing polyether with acrylic acid.

Preferred hydroxyl group-containing polyethers usable herein are those obtained by adding one or more alkylene oxides to a polyhydric alcohol. Examples of the polyhydric alcohol include 1,3-butanediol, 1,4-butanediol, 1,6-hexanediol, ethylene glycol, diethylene glycol, triethylene glycol, neopentyl glycol, polyethylene glycol, polypropylene glycol, trimethylolpropane, pentaerythritol, dipentaerythritol, bisphenol A, hydrogenated bisphenol A, thiodiethanol, glycerol, triethanolamine, sorbitol, hydroquinone, pyrogallol, xylylene glycol, 4,4'-dihydroxydiphenylmethane, trishydroxyethyl isocyanurate, and bishydroxyethylhydantoin. Examples of the alkylene oxides include ethylene oxide and propylene oxide.

Preferred alcohol acrylates are those obtained by reacting an aromatic or aliphatic alcohol having at least one hydroxyl group in its molecule or an alkylene oxide adduct thereof with acrylic acid. Examples of them include 2-ethylhexyl acrylate, 2-hydroxyethyl acrylate, 2-hydroxypropyl acrylate, isoamyl acrylate, lauryl acrylate, stearyl acrylate, isooctyl acrylate, tetrahydrofurfuryl acrylate, isobornyl acrylate, benzyl acrylate, 1,3-butanediol diacrylate, 1,4-butanediol diacrylate, 1,6-hexanediol diacrylate, diethylene glycol diacrylate, triethylene glycol diacrylate, neopentyl glycol diacrylate, polyethylene glycol diacrylate, polypropylene glycol diacrylate, trimethylolpropane triacrylate, pentaerythritol triacrylate and dipentaerythritol hexaacrylate.

The acrylate resin has a viscosity at 50° C. of nearly 0 to 10,000 P, preferably 1 to 1,000 P.

The curing of the acrylate resin is inhibited by oxygen in the air. Usually the reaction velocity is increased by addition of a low-molecular acrylate monomer such as a styrene monomer. However, many of the low-molecular acrylate monomers seriously irritate the skin.

Since the actinic radiation-curable organic compound in the optical molding resin composition of the present invention is produced from a polyene compound having at least two actinic radiation-reactive carbon-to-carbon double bonds in the molecule, such as an acrylate resin, and a polythiol compound, the curing of this compound is not inhibited by oxygen in the air. Therefore, the use of the low-molecular acrylate monomer is unnecessary and an acrylate resin which does not seriously irritate the skin can be used. The molecular weight of such an acrylate resin which does not seriously irritate the skin is preferably at least 100, still preferably at least 300, and particularly preferably at least 500.

The polyene compound constituting the actinic radiation-curable, radical-polymerizable organic compound used in the present invention is one derived from a substituted or unsubstituted allyl alcohol having at least two actinic radiation-reactive carbon-to-carbon double bonds in its molecule. Triallyl cyanurate and triallyl isocyanurate are particularly preferably usable.

Preferred polyene compounds derived from substituted or unsubstituted allyl alcohols having at least two actinic radiation-reactive carbon-to-carbon double bonds in the molecule include those derived from adducts obtained by adding an epoxy group-containing organic compound to a substituted or unsubstituted allyl alcohol as shown by the following general formulae (2) to (5):

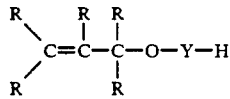
(2)

wherein R groups may be the same or different from each other and each represent a hydrogen atom, a phenyl group or an alkyl group having 1 to 10 carbon atoms; and Y represents a group formed by ring opening through the cleavage of the carbon-to-oxygen bond of an epoxy group of one or more epoxy compounds selected from the group consisting of ethylene oxide, propylene oxide, butylene oxide, styrene oxide, cyclohexene oxide, epihalohydrins, and allyl glycidyl ether, wherein only one of such a group is present or a plurality of such groups are arranged in block or at random, with the proviso that Y has at least one group formed by ring opening through the cleavage of the carbon-to-oxygen bond of the epoxy group of the allyl glycidyl ether;

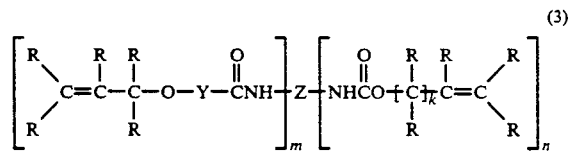
(3)

wherein R groups may be the same or different from each other and each represent a hydrogen atom, a phenyl group or an alkyl group having 1 to 10 carbon atoms; Y represents a group formed by ring opening through the cleavage of the carbon-to-oxygen bond of an epoxy group of one or more epoxy compounds selected from the group consisting of ethylene oxide, propylene oxide, butylene oxide, styrene oxide, cyclohexene oxide, epihalohydrins, and allyl glycidyl ether, wherein only one of such a group is present or a plurality of such groups are arranged in block or at random; Z represents an (m+n)-valent isocyanate-terminated monomer residue having one or more aromatic nuclei, an (m+n)-valent isocyanate-terminated monomer residue having one or more alicyclic nuclei, an (m+n)-valent aliphatic isocyanate-terminated monomer residue, a trimer of the isocyanate-terminated monomer, an isocyanate-terminated prepolymer residue obtained from a hydroxy-terminated saturated polyester polyol and the above-described isocyanate-terminated monomer, an isocyanate-terminated prepolymer residue obtained from a hydroxy-terminated saturated polyether-polyl and the above-described isocyanate-terminated monomer, or an isocyanate-terminated compound residue obtained from the above-described isocyanate-terminated monomer and a polyhydric alcohol; k represents 1 to 10, m represents 1 to 6; n represents an integer of 0 to 5; and (m+n) is an integer of at least 2;

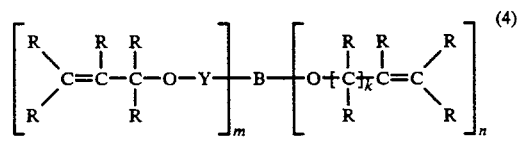
(4)

wherein R groups may be the same or different from each other and each represent a hydrogen atom, a phenyl group or an alkyl group having 1 to 10 carbon atoms; Y represents a group formed by ring opening through the cleavage of the carbon-to-oxygen bond of an epoxy group of one or more epoxy compounds selected from the group consisting of ethylene oxide, propylene oxide, butylene oxide, styrene oxide, cyclohexene oxide, epihalohydrins, and allyl glycidyl ether, wherein only one of such a group is present or a plurality of such groups are arranged in block or at random; B represents an (m+n)-valent saturated or unsaturated aliphatic carboxylic acid residue having 4 to 10 carbon atoms and capable of being bonded to another group through an ester bond, an (m+n)-valent carboxylic acid residue having an aromatic nucleus capable of being bonded to another group through an ester bond or an (m+n)-valent carboxylic acid residue having an alicyclic nucleus capable of being bonded to another group through an ester bond; k represents 1 to 10; m represents 1 to 6; n represents an integer of 0 to 5; and (m+n) is an integer of at least 2;

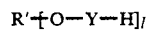 (5)

wherein R' represents a hydrogen atom, an l-valent organic residue free from an olefinic double bond and having 1 to 30 carbon atoms which may have an oxygen, nitrogen, sulfur, silicon or halogen atom, or a group derived from a saturated polyesterpolyol having a molecular weight of 100 to 10,000 by removing the hydroxyl groups therefrom; Y represents a group formed by ring opening through the cleavage of the carbon-to-carbon bond of an epoxy group of one or more epoxy compounds selected from the group consisting of ethylene oxide, propylene oxide, butylene oxide, styrene oxide, cyclohexene oxide, epihalohydrins, and allyl glycidyl ether, wherein only one such group is present or a plurality of such groups are arranged in block or at random, with the proviso that at least two groups formed by ring opening through the cleavage of the carbon-to-oxygen bond of the epoxy group of the allyl glycidyl are present in the above general formula; and l represents an integer of 1 to 6.

The polyene compound represented by the above general formula (2) is obtained by adding an epoxy group-containing organic compound (at least one molecule of which must be allyl glycidyl ether) to a substituted or unsubstituted allyl alcohol.

The adducts of the epoxy group-containing organic compound with the substituted or unsubstituted allyl alcohol can be obtained by various known processes. For instance, they can be easily obtained by adding a catalyst such as a BF$_3$ ether complex to allyl alcohol, adding allyl glycidyl ether thereto dropwise under heating (about 60° C.) and then completing the reaction.

Examples of the substituted or unsubstituted allyl alcohols usable herein include allyl alcohol, crotyl alcohol, 1-hydroxypentene-2, 1-hydroxyhexene-2, 1-hydroxyheptene-2, 1-hydroxynonene-2, 1-hydroxydecene-2, 3-hydroxybutene-1, 3-hydroxypentene-2, 2-hydroxyhexene-3, 3-hydroxy-2,3-dimethylbutene-1, 4-hydroxy-2,3,4-trimethylpentene-2, and 2-hydroxy-2,3,4,5-tetramethylhexene-3.

Examples of the epoxy group-containing organic compounds include ethylene oxide, propylene oxide, butylene oxide, allyl glycidyl ether, cyclohexene oxide, styrene oxide and epihalohydrins. They are used either singly or in the form of a mixture of two or more of them and they are added at random or in blocks, with the proviso that at least one molecule of allyl glycidyl ether must be contained in the adduct.

Examples of the polyene compounds of the general formula (2) include an adduct of allyl alcohol with allyl glycidyl ether, an adduct of allyl alcohol with allyl glycidyl ether and epichlorohydrin, an adduct of allyl alcohol with allyl glycidyl ether and ethylene oxide, and an adduct of allyl alcohol with allyl glycidyl ether, epichlorohydrin and ethylene oxide.

The polyene compound of the general formula (2) has a viscosity at 50° C. of nearly 0 to 10,000 P, preferably 1 to 1,000 P.

The polyene compound of the above general formula (3) is obtained by, for example, adding an epoxy group-containing organic compound to a substituted or unsubstituted allyl alcohol and then reacting the adduct with a polyvalent isocyanato group-containing compound.

The adducts of the epoxy group-containing organic compound to the substituted or unsubstituted allyl alcohol can be obtained by various known processes. For instance, a catalyst such as a BF$_3$/ether complex is added to allyl alcohol, epichlorohydrin is added dropwise thereto under heating (about 60° C.) and then the reaction is completed to easily obtain the intended compound. Some of the adducts are available on the market (for instance, 1 to 4 mol ethylene oxide adduct of allyl alcohol is put on the market as Allyl glycol by Nippon Nyukazai Co., Ltd.).

Examples of the substituted or unsubstituted allyl alcohols usable herein include allyl alcohol, crotyl alcohol, 1-hydroxypentene-2, 1-hydroxyhexene-2, 1-hydroxyheptene-2, 1-hydroxynonene-2, 1-hydroxydecene-2, 3-hydroxybutene-1, 3-hydroxypentene-2, 2-hydroxyhexene-3, 3-hydroxy-2,3-dimethylbutene-1, 4-hydroxy-2,3,4-trimethylpentene-2, and 2-hydroxy-2,3,4,5-tetramethylhexene-3.

Examples of the epoxy group-containing organic compounds include ethylene oxide, propylene oxide, butylene oxide, allyl glycidyl ether, cyclohexene oxide, styrene oxide and epihalohydrins. They are used either singly or in the form of a mixture of two or more of them and they are added at random or in blocks. Examples of the preferred adducts include those of allyl alcohol with allyl glycidyl ether, those of allyl alcohol with allyl glycidyl ether and epichlorohydrin, those of allyl alcohol with allyl glycidyl ether and ethylene oxide, and those of allyl alcohol with allyl glycidyl ether, epichlorohydrin and ethylene oxide.

The preferred polyene compound of the above general formula (3) is obtained by, for example, reacting the adduct of the epoxy group-containing organic compound of the substituted or unsubstituted allyl alcohol obtained as described above with a polyvalent isocyanate group-containing compound. An example of a process for producing the polyene comprises an ordinary urethanization reaction of a commercially available ethylene oxide adduct of allyl alcohol (Allyl glycol, a product of Nippon Nyukazai Co., Ltd.) with Hylene W (dicyclohexylmethane 4,4'-diisocyanate, a product of DuPont) in such amounts that the hydroxyl groups will be equivalent to the isocyanate groups.

Examples of the polyvalent isocyanate group-containing compounds include the above-described Hylene W as well as monomeric polyisocyanate compounds such as tolylene diisocyanate, diphenylmethane 4,4'-diisocyanate, xylylene diisocyanate, isophorone diisocyanate, and hexamethylene diisocyanate; trimers of tolylene diisocyanate and isophorone diisocyanate; isocyanate-terminated prepolymers obtained from a hydroxy-terminated saturated compound such as a polyesterpolyol or polyetherpolyol and the above-described monomeric polyisocyanate compounds; and isocyanate-terminated compounds obtained from the above-described monomeric polyisocyanate compound and the polyhydric alcohol listed above with reference to the polythiol compound (1). The saturated polyester polyols are obtained by the esterification of the above-described polyhydric alcohol with a polycarboxylic acid such as succinic, adipic, sebacic, phthalic, hexahydrophthalic, trimellitic or pyromellitic acid. Examples of the polyetherpolyols include polyethylene glycol, polypropylene glycol, polybutylene glycol, polytetramethylene glycol and the above-described alkylene oxide adducts of the polyhydric alcohols having a molecular weight of 100 to 10,000.

The polyene compounds of the general formula (3) can include also polyene compounds obtained by a process wherein an adduct of an epoxy group-containing compound and a substituted or unsubstituted allyl alcohol is reacted with a polyvalent isocyanate compound in such a manner that the isocyanato groups partially remain unreacted and then the unreacted isocyanato groups are reacted with an unsaturated alcohol. The reaction is conducted also in such a manner that each molecule has at least one adduct of an epoxy group-containing compound with the substituted or unsubstituted allyl alcohol. For example, the above-described allyl glycol is reacted with Hylene W in an equivalent ratio of 1.0/2.0 to 1.9/2.0 (the isocyanate groups being in excess) to form a partially capped isocyanate. Then an unreacted isocyanate group is reacted with allyl alcohol to form the intended polyene. Examples of the unsaturated alcohols include the above-described allyl alcohols as well as crotyl alcohol, 3-hydroxybutene-1, 4-hydroxypentene-2, 2-hydroxyhexene-3, 2-hydroxyheptene-3, 2-hydroxyoctene-3, 2,3-dimethyl-1-hydroxybutene-2, 2,3-dimethyl-3-hydroxypentene-2, 4-hydroxybutene-1, 5-hydroxypentene-1, 6-hydroxyhexene-1, 7-hydroxyheptene-1, and 8-hydroxyoctene-1.

The polyene compound of the general formula (3) has a viscosity at 50° C. of nearly 0 to 10,000 P, preferably 1 to 1,000 P.

The polyene compound of the above general formula (4) is obtained by, for example, adding the epoxy group-containing organic compound to the substituted or unsubstituted allyl alcohol and then reacting the adduct with an acid anhydride or polybasic acid.

The adduct of the epoxy group-containing organic compound with the substituted or unsubstituted allyl alcohol are obtained by various known processes. For example, they can be easily obtained by adding a catalyst (such as a $BF_3$/ether complex) to allyl alcohol, adding epichlorohydrin thereto dropwise under heating (about 60° C.), and completing the reaction. Some of the adducts are available on the market (for instance, 1 to 4 mol ethylene oxide adduct of allyl alcohol is put on the market as Allyl glycol by Nippon Nyukazai Co., Ltd.).

Examples of the substituted or unsubstituted allyl alcohols usable herein include allyl alcohol, crotyl alcohol, 1-hydroxypentene-2, 1-hydroxyhexene-2, 1-hydroxyheptene-2, 1-hydroxynonene-2, 1-hydroxydecene-2, 3-hydroxybutene-1, 3-hydroxypentene-2, 2-hydroxyhexene-3, 3-hydroxy-2,3-dimethylbutene-1, 4-hydroxy-2,3,4-trimethylpentene-2 and 2-hydroxy-2,3,4,5-tetramethylhexene-3.

Examples of the epoxy group-containing organic compounds include ethylene oxide, propylene oxide, butylene oxide, allyl glycidyl ether, cyclohexene oxide, styrene oxide and epihalohydrins. They are used either singly or in the form of a mixture of two or more of them and they are added at random or in blocks. Examples of the preferred adducts include those of allyl alcohol with allyl glycidyl ether, those of allyl alcohol with allyl glycidyl ether and epichlorohydrin, those of allyl alcohol with allyl glycidyl ether and ethylene oxide, and those of allyl alcohol with allyl glycidyl ether, epichlorohydrin and ethylene oxide.

The preferred polyene compound of the above general formula (4) is obtained by, for example, reacting the adduct of the epoxy group-containing organic compound of the substituted or unsubstituted allyl alcohol obtained as described above with an acid anhydride or polybasic acid. An example of processes for producing the polyene comprises an ordinary esterification reaction of a commercially available ethylene oxide adduct of allyl alcohol (Allyl glycol, a product of Nippon Nyukazai Co., Ltd.) with phthalic anhydride.

Examples of the acid anhydrides and polybasic acids usable as a starting material for the polyene compounds of the general formula (4) include maleic anhydride, succinic anhydride, hexahydrophthalic anhydride, adipic acid, succinic acid, sebacic acid, phthalic acid, terephthalic acid, isophthalic acid, maleic acid, fumaric acid and itaconic acid.

The polyene compounds of the general formula (4) can include those produced by a process which will be described below in addition to those produced by the above-described process. In this process, an epoxy group-containing compound/substituted or unsubstituted allyl alcohol adduct is reacted with the above-described acid anhydride or polybasic acid in such a manner that the carboxy groups partially remain unreacted and then the unreacted carboxyl groups are reacted with an unsaturated alcohol. The reaction is conducted also in such a manner that each molecule has at least one epoxy group-containing organic compound-/substituted or unsubstituted allyl alcohol adduct. For example, the above-described Allyl glycol is reacted with phthalic anhydride in an equivalent ratio of 1.0/2.0 to 11.9/2.0 (excess acid anhydride) to form a partial ester. Then unreacted carboxyl groups are reacted with allyl alcohol to form the intended polyene. Examples of the unsaturated alcohols include the above-described allyl alcohols as well as crotyl alcohol, 3-hydroxybutene-1, 4-hydroxypentene-2, 2-hydroxyhexene-3, 2-hydroxyheptene-3, 2-hydroxyoctene-3, 2,3-dimethyl-1-hydroxybutene-2, 2,3-dimethyl-3-hydroxypentene-2, 4-hydroxybutene-1, 5-hydroxypentene-1, 6-hydroxyhexene-1, 7-hydroxyheptene-1 and 8-hydroxyoctene-1.

The polyene compound of the general formula (4) has a viscosity at 50° C. of nearly 0 to 10,000 P, preferably 1 to 1,000 P.

The polyene compounds of the above general formula (5) are allyl glycidyl ether adducts of monohydric or polyhydric alcohols or saturated polyesterpolyols. They are adducts of at least two mol of allyl glycidyl ether per molecule. Polyenes to which various epoxy compounds having a three-membered ring are added are also preferably used, if necessary, in addition to the allyl glycidyl ether. For example, they can be easily obtained by adding a $BF_3$/ether complex as the catalyst to methanol, adding allyl glycidyl ether dropwise thereto at 60° C. and completing the reaction. Preferred monohydric alcohols include aliphatic, alicyclic and aromatic alcohols and alcohols having O, N, S or halogen atoms, such as methanol, ethanol, propanol, butanol, amyl alcohol, hexyl alcohol, octanol, 2-ethylhexanol, decanol, cyclohexanol, methoxyethanol, methylthioethanol, N,N-dimethylethanol, phenol, 2,6-dimethylphenol and ethylene chlorohydrin. The polyhydric alcohols include di- to hexahydric aliphatic, alicyclic and aromatic alcohols and alcohols having O, N or S atoms listed above with reference to the polythiol compounds (1). Examples of the saturated polyesterpolyols include those having a molecular weight of 100 to 10,000 obtained by known esterification of the above-described polyhydric alcohol with a carboxylic acid such as succinic, adipic, sebacic, phthalic, hexahydrophthalic, trimellitic or pyromellitic acid.

Examples of the epoxy compounds having a three-membered ring which can be used in addition to the allyl glycidyl ether include ethylene oxide, propylene oxide, butylene oxide, cyclohexene oxide, styrene oxide and epihalohydrins. They can be used either singly or in the form of a mixture of two or more of them or a mixture of them with allyl glycidyl ether.

The epoxy compound having a three-membered ring can be added to water or the like by any known process in the presence of an acid catalyst such as sulfuric acid, $BF_3$/ether complex or tin tetrachloride, or a basic catalyst such as NaOH, KOH or triethylamine.

The viscosity of the polyene compound of the general formula (5) at 50° C. is nearly 0 to 10,000 P, preferably 1 to 1,000 P.

Triallyl cyanurate and triallyl isocyanurate each has a good reactivity to actinic radiation such as ultraviolet rays, since its viscosity at 25° C. is as low as 200 cps or less and it has three actinic radiation-reactive carbon-to-carbon double bonds in the molecule. Therefore, it can be used as a reactive diluent in the optical molding resin composition of the present invention.

These polyene compounds can be used either singly or in the form of a mixture of two or more of them.

The term "actinic radiation-sensitive radical polymerization initiator" herein refers to a compound capable of releasing a substance capable of initiating radical polymerization by irradiation with actinic radiation. The compound includes ketone, azide, azo, diazo and peroxide compounds. Examples of the ketone compounds include diethoxyacetophenone, 2-hydroxymethyl-1-phenylpropan-1-one, 4'-isopropyl-2-hydroxy-2-methylpropiophenone, 2-hydroxy-2-methylpropiophenone, p-dimethylamino-acetophenone, p-tert-butyldichloroacetophenone, p-tert-butyltrichloroacetophenone, p-azidobenzalacetophenone, benzoin, benzoin methyl ether, benzoin ethyl ether, benzoin isopropyl ether, benzoin n-butyl ether, benzoin isobutyl ether, benzil, benzil dimethyl ketal, benzyl β-methoxyethyl acetal, 1-hydroxycyclohexyl phenyl ketone, benzophenone, methyl o-benzoylbenzoate, Michler's ketone, 4,4'-bisdiethylaminobenzophenone, 4,4'-dichlorobenzophenone, thioxanthone, 2-methylthioxanthone, 2-ethylthioxanthone, 2-chlorothioxanthone, and 2-isopropylthioxanthone. Examples of the azide compounds include 4,4'-diazidostilbene and p-phenylenebisazide. Examples of the azo compounds include 2,2'-azobisisobutyronitrile and 2,2'-azobisdimethylvaloronitrile. An example of the diazo compounds is diazoaminobenzene. The peroxide compound includes di-tert-butyl peroxide.

Among these actinic radiation-sensitive radical polymerization initiators, the ketones are preferably used.

These actinic radiation-sensitive radical polymerization initiators can be used singly or in combination of two or more of them depending on the desired properties.

Now, the description will be made on the relative amounts of the components of the optical molding resin composition of the present invention.

The optical molding resin composition of the present invention comprises, as the essential components, an actinic radiation-curable, radical-polymerizable organic compound comprising one or more polythiol compounds and one or more polyene compounds having at least two actinic radiation-reactive carbon-to-carbon double bonds in the molecule, and an actinic radiation-sensitive radical polymerization initiator.

The ratio of the polythiol compound to the polyene compound is preferably selected so that the equivalent ratio of the actinic radiation-reactive carbon-to-carbon double bonds in the polyene compound to the thiol groups in the polythiol compound will be 0.7 to 1.5. Preferred results are obtained particularly when the ratio is around 1.0. When the equivalent ratio of the carbon-to-carbon double bonds in the polyene compound to the thiol groups in the polythiol compound is less than 0.7 or higher than 1.5, the actinic radiation curability of the composition is seriously unfavorably impaired.

The amount of the actinic radiation-sensitive radical polymerization initiator added can be suitably selected depending on the kind thereof. The preferred amount thereof is, however, 0.1 to 20 parts by weight for 100 parts by weight of the actinic radiation-curable, radical-polymerizable organic compound. When the amount of the initiator added is less than 0.1 part by weight or more than 20 parts by weight for 100 parts by weight of the organic compound, the actinic radiation curability of the composition is seriously unfavorably impaired.

The actinic radiation-sensitive radical polymerization initiators can be used singly or in combination of two or more of them depending on the desired properties.

Thermosetting properties can be imparted to the optical molding resin composition of the present invention by adding a radical-forming agent. The radical-forming agent includes peroxides, azo compounds and combinations of a peroxide with a decomposition accelerator.

The peroxides include ketone peroxides such as methyl ethyl ketone peroxide and cyclohexanone peroxide; diacyl peroxides such as benzoyl peroxide and lauroyl peroxide; hydroperoxides such as tert-butyl hydroperoxide and cumene hydroperoxide; dialkyl peroxides such as di-tert-butyl peroxide and dicumyl peroxide; alkyl peresters such as tert-butyl perbenzoate; and inorganic peroxides such as lead peroxide and manganese peroxide. The azo compounds include 2,2'-azobisisobutyronitrile, 2,2' azobisdimethylvaleronitrile and 2,2'-azobis-(2,3,3-trimethylbutyronitrile). The peroxides can be used in combination with a decomposition accelerator such as a salt of a heavy metal, e.g., cobalt, manganese, iron or copper, or a tertiary amine, e.g., dimethylaniline or dimethyl-p-toluidine.

The amount of the radical-forming agent can be suitably selected depending on the kind thereof. It is preferably not more than 50 parts by weight, particularly not more than 30 parts by weight, for 100 parts by weight of the mixture of the polythiol compound and the polyene compound. When the amount of the radical-forming agent is more than 50 parts by weight for 100 parts by weight of the actinic radiation-curable, radical-polymerizable organic compound, the actinic radiation curability thereof is seriously impaired unfavorably.

The radical-forming agent can be used singly or in combination of two or more of them depending on the intended properties.

The actinic radiation curability of the optical molding resin composition of the present invention can be accelerated by the addition of an accelerator. The accelerators are preferably amine compounds. Examples of them include monoethanolamine, diethanolamine, triethanolamine, 4,4'-bisdiethylaminobenzophenone, ethyl 4-dimethylaminobenzoate, isopentyl 4-dimethylaminobenzoate and 2-(dimethylamino)ethyl benzoate; high-molecular amine compounds produced from an epoxy resin and an amine compound; and compounds derived from the above-described amine compounds, such as triethanolamine triacrylate.

The amount of the accelerator can be suitably selected depending on the kind thereof. It is preferably not more than 50 parts by weight for 100 parts by weight of a mixture of the polythiol compound and the polyene compound. It is still preferably 30 parts by weight or less. When the amount of the accelerator is more than 50 parts by weight for 100 parts by weight of the actinic radiation-curable, radical-polymerizable organic compound, the actinic radiation curability thereof is rather seriously unfavorably impaired.

The accelerator can be used singly or in combination of two more of them depending on the desired properties.

The pot life of the optical molding resin composition of the present invention can be prolonged by adding a stabilizer thereto.

Examples of the stabilizer include quaternary ammonium chlorides such as benzyltrimethylammonium chloride, diethylhydroxyamine, cyclic amides, nitrile compounds, substituted ureas, benzothiazole, 4-amino-2,2,6,6,-tetramethylpiperidine, bis(1,2,2,6,6-pentamethyl-4-piperidinyl) sebacate, organic acids such as lactic, oxalic, citric, tartaric and benzoic acids, hydroquinone and its alkyl ethers, tert-butylpyrocatechol, phosphorus acid compounds such as tridecyl phosphite, organic phosphines, phosphites, copper compounds such as copper naphthenate and trichloroethyl phosphite/cuprous chloride adduct, and iron and manganese caprylates, naphthenates and sulfoxides.

The pot life of the optical molding resin composition of the present invention at 20° C. in a dark place is 6 months or more, even when no stabilizer is incorporated thereinto, and such a long pot life is practically enough. The pot life can be further prolonged to 12 months or longer by incorporating the stabilizer thereinto. The amount of the stabilizer can be suitably selected depending on the kind thereof. It is usually preferable to be not more than 50 parts by weight for 100 parts by weight of the mixture of the polythiol compound and polyene compound. Still preferably, the amount of the stabilizer is not more than 30 parts by weight. When the amount of the stabilizer added is more than 50 parts by weight for 100 parts by weight of the actinic radiation-curable, radical-polymerizable organic compound, the actinic radiation curability thereof is seriously unfavorably impaired.

The stabilizer can be used singly or in combination of two or more of them depending on the desired properties.

The pot life of the optical molding resin composition of the present invention under fluorescent lighting can be further prolonged by incorporating an ultraviolet absorber thereinto.

The ultraviolet absorber includes benzophenone compounds such as 2-hydroxybenzophenone, 2,4-dihydroxybenzophenone, 2-hydroxy-4-methoxybenzophenone, 2,2',4-trihydroxybenzophenone, 2,2'-dihydroxy-4-methoxybenzonephenone, and 2,2',4,4'-tetrahydroxybenzophenone; salicylate compounds such as phenyl salicylate, 2,4-di-tert-butylphenyl 3,5-di-tert-butyl-4-hydroxybenzoate; benzotriazole compounds such as (2'-hydroxyphenyl)benzotriazole, (2'-hydroxy-5'-methylphenyl)benzotriazole and (2'-hydroxy-3'-tert-butyl-5'-methylphenyl)-5-chlorobenzotriazole; acrylonitrile compounds such as ethyl 2-cyano-3,3-diphenylacrylate and methyl 2-carbomethoxy-3-(p-methoxy)acrylate; metal complex compounds such as nickel [2,2'-thiobis(4-tert-octyl)phenolate]n-butylamine, nickel dibutyl dithiocarbamate and cobalt dicyclohexyl dithiophosphate; and hindered amine compounds such as bis)2,2,6,6-tetramethylpiperidinyl-4) sebacate.

The optical molding resin composition of the present invention has a pot life under fluorescent lighting at 20° C. of as long as two weeks or more, even when an ultraviolet absorber is not used, which is practically enough. The pot life can be further prolonged to exceed one month by adding an ultraviolet absorber thereto. The amount of the ultraviolet absorber, which can be selected depending on the kind thereof, is preferably 50 parts by weight or less, still preferably 30 parts by weight or less, for 100 parts by weight of the mixture of the polythiol compound and the polyene compound. When the amount of the ultraviolet absorber added is more than 50 parts by weight for 100 parts by weight of the actinic radiation-curable, radical-polymerizing organic compound, the actinic radiation curability thereof is seriously unfavorably impaired.

The ultraviolet absorber can be used singly or in combination of two or more of them depending on the desired properties.

The optical molding resin composition of the present invention can contain, if necessary, suitable amounts of a colorant such as a pigment or dye, filler, antifoaming agent, leveling agent, thickening agent, flame retardant, plasticizer, solvent, modifying resin, etc., so far as the effect of the invention is not impaired.

The viscosity of the composition of the present invention is preferably not higher than 5,000 cps and still preferably not higher than 2,000 cps, at ambient temperature. When the viscosity of the composition is excessively high, a long molding time is necessitated and, therefore, its workability is reduced.

Since the volume of the molding resin composition is usually reduced upon curing, it is necessary to minimize its shrinkage from the viewpoint of dimensional accuracy. The volume reduction of the composition of the present invention upon curing is preferably 5% or less and still preferably 3% or less.

In an embodiment of the process of the present invention, the optical molding resin composition of the present invention is placed in a vessel and actinic radiation selectively applied thereto, in an amount necessary for curing, from a light guide by relatively moving the vessel and the light guide to form a solid of a desired shape as described in Japanese Patent Laid-Open No. 247515/1985. The actinic radiation used in curing the composition of the present invention includes ultraviolet rays, X-rays, radioactive radiation and high-frequency radiation. Among them, ultraviolet rays having a wavelength range of 1,800 to 5,000 Å are preferred from an economic viewpoint. The light sources usable herein include ultraviolet laser, mercury lamp, xenon lamp, sodium lamp and alkali metal lamp. A particularly preferred light source is a laser light source capable of elevating the energy level to reduce the molding time and also capable of improving the molding accuracy, taking advantage of its excellent concentrating capacity. A point source which concentrates ultraviolet rays from various lamps such as a mercury lamp is also effective. To selectively apply the actinic radiation necessary for curing the resin composition, the resin composition is irradiated with two or more luminous fluxes each having a wavelength twice as long as that suitable for the curing of the resin composition and a uniform phase in such a manner that they cross each other in the resin to obtain actinic radiation necessary for curing the resin composition by two-photon absorption, and the intersection of the lights is moved. The luminous flux having a uniform phase can be obtained with, for example, laser beam.

Since the resin composition of the present invention is cured by radical polymerization induced by the actinic radiation, it can be heated to about 30° to 100° C. during the irradiation with the actinic radiation in order to effectively accelerate the cross-linking curing reaction depending on the kind of the radical-polymerizable organic compound used. Further, the obtained molding can be subjected to heat treatment at a temperature of 40° to 100° C. or ultraviolet irradiation treatment with a mercury lamp or the like to obtain a molding having higher mechanical strength.

The optical molding resin composition of the present invention is usable as a quite excellent starting material for producing a three-dimensional model by layering. Thus, a model can be produced without using any mold.

Further, a model of any shape having, for instance, a free curved surface, can be produced by docking with CAD/CAM. The industrial value of the composition is thus quite high. The resin composition of the present invention can be widely used for the production of, for instance, models for inspecting the apparent design of an article in the course of designing it, models for checking objectionable points of combining parts, die models for the production of molds and copying models for the production of molds.

More specifically, the composition can be used for the production of models having curved surfaces such as the parts of automobiles, electronic and electric components, furniture, building structures, toys, vessels, castings and dolls, or it can be processed into an intended article.

According to the present invention an optical molding resin composition having excellent curability upon irradiation with actinic radiation and only a low shrinkage on curing can be obtained and the curing of this composition is not inhibited by oxygen in the air.

As for ease in handling, the optical molding resin composition of the present invention can be handled quite safely, since curing thereof is not inhibited by oxygen and neither polyfunctional monomers nor diluents having skin-irritating properties or strong smell are used for producing it. Acrylate resins have problems in that since a polyfunctional monomer or diluent is used in order to increase the reactivity thereof in air, they have severe skin-irritating properties and a strong smell.

EXAMPLES

The following typical examples of the present invention will further illustrate the present invention, but by no means limit it. In the Examples, parts are given by weight.

EXAMPLE 1

Dipentaerythritol hexaacrylate as the polyene compound was mixed with pentaerythritol tetrakisthioglycolate as the polythiol compound in such amounts that the equivalent ratio of the carbon-to-carbon double bond to the thiol group was 1.0. 5.0 parts by weight of benzophenone as the actinic radiation-sensitive radical polymerization initiator was mixed in 100 parts by weight of the mixture to obtain an optical molding resin composition.

A cone having a diameter at the bottom of 12 mm, a height of 15 mm and a thickness of 0.5 mm was produced from the resin composition by an optical shaping experiment system comprising a three-dimensional NC (numerically controlled) table having a vessel for the resin composition placed thereon, a helium-cadmium laser and a controller mainly consisting of an optical system and a personal computer. The conical product was free from deformation and had a quite excellent molding accuracy and excellent mechanical strength. Its molding time was 40 min. The molding accuracy thereof was determined as follows: the diameter of the bottom of the mold was measured at 10 arbitrary places and the dispersion thereof was determined to find that the average error from the mean value (hereinafter referred to as "accuracy") was 0.5%.

EXAMPLE 2

A mixture of 50 parts by weight of hexamethylene diisocyanate/2-hydroxyethyl acrylate urethane acrylate and 50 parts by weight of polyethylene glycol diacrylate as the polyene compounds were mixed with pentaerythritol tetrakisthioglycolate as the polythiol compound in such amounts that the equivalent ratio of the carbon-to-carbon double bond to the thiol group was 1.0. 5.0 parts by weight of benzil dimethyl ketal as the actinic radiation sensitive radical polymerization initiator was mixed with 100 parts by weight of the mixture to obtain an optical molding resin composition.

A hanging bell-shaped molding was produced from the resin composition by the laser beam shaping experiment system employed in Example 1. The molding was free from deformation and had a quite high molding accuracy and high mechanical strength This resin composition having a viscosity as low as 300 cps could be easily handled and had excellent curability upon irradiation with laser beams. Its molding time was 30 min. The same cone as that of Example 1 was produced in order to compare the molding time and molding accuracy of them. The molding time thereof was 40 min and its accuracy was 0.3%.

EXAMPLE 3

Bisphenol A epoxy acrylate as the polyene compound was mixed with pentaerythritol tetrakis-β-mercaptopropionate as the polythiol compound in such amounts that the equivalent ratio of the carbon-to-carbon double bond to the thiol group was 1.0. 5.0 parts by weight of 2,2-diethoxyacetophenone as the actinic radiation-sensitive radical polymerization initiator was mixed with 100 parts by weight of the mixture to obtain an optical molding resin composition.

A cup-shaped molding was produced from the resin composition by the laser beam shaping experiment system used in Example 1. The molding was free from deformation and had a high molding accuracy. The same cone as that of Example 1 was produced from the resin under heating at 60° C. The curing velocity upon irradiation with laser beams was high, since the resin was heated. The molding time was as short as 30 min. The accuracy was 0.5%.

COMPARATIVE EXAMPLE 1

100 parts of dipentaerythritol hexaacrylate was mixed with 5 parts of benzophenone to obtain an actinic radiation-curable polymerizable composition. The same cone as that produced in Example 1 was produced from the composition by the same laser beam shaping experiment system used in Example 1. Its curing velocity upon irradiation with laser beams was low, since the curing was inhibited by oxygen in the air, and its molding time was as long as 120 min. The obtained molding was deformed by shrinkage on curing and had a low accuracy of 5%.

COMPARATIVE EXAMPLE 2

70 parts of dipentaerythritol hexaacrylate, 30 parts of trimethylolpropane triacrylate and 10 parts of benzophenone were mixed together to obtain an actinic radiation-curable polymerizable composition. A cone similar to that of Example 1 was produced from the composition by the same laser beam shaping experiment system as that of Example 1. Although its molding time was shorter than that of Comparative Example 1 because the low-molecular monomer (trimethylolpropane triacrylate) was incorporated thereinto and the amount of the radical polymerization initiator (benzophenone) was increased to 10 parts to accelerate its curing, its molding time was still as long as 80 min, since its curing was inhibited by oxygen in the air. Its molding accuracy was as bad as 15%, since its shrinkage on curing increased as its curing velocity increased.

EXAMPLE 4

58 g (1 mol) of allyl alcohol and 0.5 g of a $BF_3$ ether complex were placed in a 500-ml four-necked flask purged with nitrogen and equipped with a condenser and a dropping funnel. 228 g (2 mol) of allyl glycidyl ether was added dropwise thereto for 3 h while keeping the reaction temperature at 60° to 70° C. Then 185 g (2 mol) of epichlorohydrin was added thereto dropwise at that reaction temperature. The time taken for the addition was 2.5 h. After the completion of the addition, the reaction mixture was stirred for 1 h while keeping the reaction temperature at 70° C. to complete the reaction. After the completion of the reaction, degassing was conducted at 70° C. under a reduced pressure of 3 mmHg or below for 1 h, but low-boiling matter was scarcely recovered. The product was in the form of a colorless, transparent liquid having a viscosity at 25° C. of 50 cps or below. This product will be hereinafter referred to as "Polyene 1".

Polyene 1 as the polyene compound was mixed with pentaerythritol tetrakisthioglycolate as the polythiol compound in such amounts that the equivalent ratio of the carbon-to-carbon double bond to the thiol group was 1.0. 5.0 parts by weight of benzophenone as the actinic radiation-sensitive radical polymerization initiator was mixed in 100 parts by weight of the mixture to obtain an optical molding resin composition.

A cone having a diameter at the bottom of 12 mm, a height of 15 mm and a thickness of 0.5 mm was produced from the resin composition by an optical shaping experiment system comprising a three-dimensional NC (numerically controlled) table having a vessel for the resin composition placed thereon, a helium-cadmium laser and a controller mainly consisting of an optical system and a personal computer. The molding was free from deformation and had a quite high molding accuracy and high mechanical strength. The molding time was 40 min and the accuracy was 0.5%.

EXAMPLE 5

131 g (0.5 mol) of dicyclohexylmethane 4,4'-diisocyanate (Hylene W, a product of DuPont) was placed in a flask in a nitrogen atmosphere. 0.8 g of dibutyltin dilaurate was added thereto and heated to 45° C. 120 g (1.0 mol) of allyl alcohol/ethylene oxide adduct (Allyl glycol, a product of Nippon Nyukazai Co., Ltd.) was placed in a dropping funnel and added to the mixture dropwise so that the reaction temperature was kept at 80° to 90° C. After the completion of the addition, the reaction was conducted at 80° to 90° C. for 2 h. The IR spectrum of the product suggested that the absorption assignable to the isocyanate group had completely disappeared and urethane bonds were formed. This product will be referred to as "Polyene 2".

50 parts of Polyene 2 was mixed with 50 parts of triallyl isocyanate to form a mixture to be used as the polyene compound. It was mixed with pentaerythritol tetrakisthioglycolate as the polythiol compound in such amounts that the equivalent ratio of the carbon-to-carbon double bond to the thiol group was 1.0. 5.0 parts by weight of benzil dimethyl ketal as the actinic radiation-sensitive radical polymerization initiator was mixed with 100 parts by weight of the mixture to obtain an optical molding resin composition.

A hanging bell-shaped molding was produced from the resin composition by the same laser beam shaping experiment system as that employed in Example 4. The molding was free from deformation and had a quite high molding accuracy and high mechanical strength. This resin composition having a viscosity of as low as 300 cps could be easily handled and had excellent curability upon irradiation with laser beams. The molding time was 30 min. A cone similar to that produced in Example 4 was produced in order to compare the molding time and molding accuracy of them. The molding time was 40 min and the accuracy was 0.3%.

EXAMPLE 6

47.1 g (0.1 mol) of Polyene 1 synthesized in Example 4, 11.8 g (0.08 mol) of phthalic anhydride, 50 g of benzene and 0.4 g of p-toluenesulfonic acid were placed in a four-necked flask and a reaction was conducted for 2 h under a reflux of benzene. Then 10.5 g (0.18 mol) of allyl alcohol was added thereto and azeotropic dehydration was conducted. After completion of the dehydration, the reaction mixture was neutralized with a 10% aqueous $HaHCO_3$ solution. The solvent was removed from the organic layer and degasification was conducted at 90° C. under 2 mmHg for 1 h. The product thus obtained will be referred to as "Polyene 3".

Polyene 3 as the polyene compound was mixed with pentaerythritol tetrakis-$\beta$-mercaptopropionate as the polythiol compound in such amounts that the equivalent ratio of the carbon-to-carbon double bond to the thiol group was 1.0. 5.0 parts by weight of 2,2-diethoxyacetophenone as the actinic radiation-sensitive radical polymerization initiator was mixed with 100 parts by weight of the mixture to obtain an optical molding resin composition.

A cup-shaped molding was produced from the resin composition under heating at 60° C. by the same laser beam shaping experiment system as that of Example 4. The molding was free from deformation and had a high molding accuracy. A cone similar to that produced in Example 4 was produced under heating at 60° C. The curing velocity by the laser beams was high because of the heating, and the molding time was as short as 30 min. The accuracy was 0.5%.

EXAMPLE 7

32.0 g (1 mol) of methanol and 0.5 g of a $BF_3$/ether complex were placed in a 500-ml four-necked flask equipped with a condenser. 285 g (2.5 mol) of allyl glycidyl ether was added dropwise thereto for 4 h under stirring while keeping the reaction temperature at 50° to 60° C. After the completion of the addition, the stirring was continued at 60° C. for an additional 1 h to complete the reaction. The reaction mixture was analyzed by gas chromatography and neither unreacted methanol nor allyl glycidyl ether was detected. The product will be referred to as "Polyene 4".

Polyene 4 as the polyene compound was mixed with pentaerythritol tetrakis-$\beta$-mercaptopropionate as the polythiol compound in such amounts that the equivalent ratio of the carbon-to-carbon double bond to the thiol group would be 1.0. 5 parts by weight of 2,2-diethoxyacetophenone as the actinic radiation-sensitive radical polymerization initiator was mixed with 100 parts by weight of the mixture to obtain an optical molding resin composition.

A hanging bell-shaped molding was produced from the resin composition by the same laser beam shaping experiment system as that of Example 4. The molding was free from deformation and had high mechanical strength, molding accuracy and surface smoothness.

A cone similar to that produced in Example 4 was produced. The molding time and molding accuracy were 40 min and 0.8%, respectively.

EXAMPLE 8

A polyether acrylate mainly composed of a compound having a structure represented by the formula (16), which had been synthesized from a propylene oxide adduct of polypropylene glycol and acrylic acid, was mixed as the polyene compound with pentaerythritol tetrakis($\beta$-mercaptopropionate) as the polythiol compound so that the equivalent ratio of the carbon-to-carbon double bond of the polyene compound to the thiol group of the polythiol compound, that is, C=C—/SH—, was 1.0.

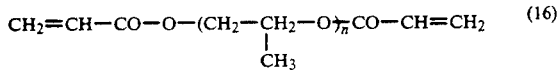

wherein n is 5 to 20.

10.0 parts by weight of benzophenone as the actinic radiation sensitive radical polymerization initiator was mixed with 100 parts by weight of the resultant mixture to obtain an optical molding resin composition.

A hanging bell-shaped molding having a diameter at the bottom of 100 mm and a height of 150 mm was produced from the resin composition by the laser beam shaping experiment system employed in Example 1. The molding was free from deformation, had a very high molding accuracy, and further was very excellent in the mechanical strength and the speed of response to the laser beam by virtue of the use of the polyether acrylate as the polyene compound. The molding time was 40 min.

A cone having a diameter of 50 mm at its bottom, a height of 65 mm and a thickness of 0.5 mm was produced in order to determine its molding time and molding accuracy. Its molding time, accuracy and Izod impact strength were 30 min, 0.45% and 27 kg·cm/cm$^2$, respectively.

EXAMPLE 9

A polyether acrylate mainly composed of a compound having a structure represented by the formula (17) which had been synthesized from a propylene oxide/ethylene oxide random adduct and acrylic acid was mixed as the polyene compound with pentaerythritol tetrakisthioglycolate as the polythiol compound so that the equivalent ratio of the carbon-to-carbon double bond of the polyene compound to the thiol group of the polythiol compound, that is, C=C—/SH—, was 1.0.

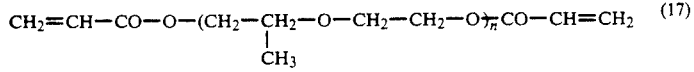

wherein n is 3 to 10.

10.0 parts by weight of benzil dimethyl ketal as the actinic radiation-sensitive radical polymerization initiator was mixed in 100 parts by weight of the resulting mixture to obtain an optical molding resin composition.

A hanging bell-shaped molding having a diameter of the bottom of 100 mm and a height of 150 mm was produced from the resin composition by the laser beam shaping experiment system employed in Example 1. The molding was free from deformation, had a very high molding accuracy, and further had excellent mechanical strength and speed of response to the laser beam by virtue of the use of the polyether acrylate as the polyene compound. The molding time was 30 min.

The same cone as that of Example 8 was produced in order to compare the molding time and molding accuracy of them. The molding time, the accuracy and the Izod impact strength were 30 min, 0.47% and 29 kg·cm/cm$^2$, respectively.

EXAMPLE 10

A polyether acrylate mainly composed of a compound having a structure represented by the formula (18) which had been synthesized from a propylene oxide/ethylene oxide random block adduct and acrylic acid was mixed as the polyene compound with pentaerythritol tetrakisthioglycolate as the polythiol compound so that the equivalent ratio of the carbon-to-carbon double bond of the polyene compound to the thiol group of the polythiol compound, that is, C=C—/SH—, was 1.0.

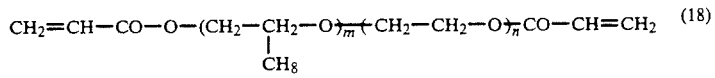

wherein m is 3 to 10 and n is 3 to 10.

5.0 parts by weight of benzoin ethyl ether as the actinic radiation-sensitive radical polymerization initiator was mixed in 100 parts by weight of the resultant mixture to obtain an optical molding resin composition.

A hanging bell-shaped molding having a diameter of the bottom of 100 mm and a height of 150 mm was produced from the resin composition by the laser beam shaping experiment system employed in Example 1. The molding was free from deformation, had a very high molding accuracy, and further had excellent mechanical strength and speed of response to the laser beam by virtue of the use of the polyether acrylate as the polyene compound. The molding time was 40 min.

The same cone as that of Example 8 was produced in order to compare the molding time and molding accuracy of them. The molding time, the accuracy and the Izod impact strength were 30 min, 0.42% and 31 kg·cm/cm$^2$, respectively.

EXAMPLE 11

A polyether acrylate mainly composed of a compound having a structure represented by the formula (19) which had been synthesized from a propylene oxide adduct of bisphenol A and acrylic acid was mixed as the polyene compound with trimethylolpropane tristhioglycolate as the polythiol compound so that the equivalent ratio of the carbon-to-carbon double bond of the polyene compound to the thiol group of the polythiol compound, that is, C=C—/SH—, was 0.8.

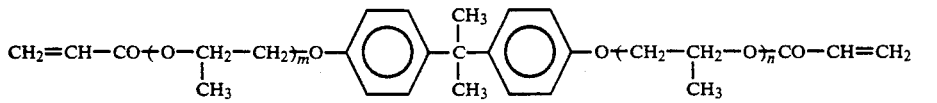

(19)

wherein m is 3 to 10 and n is 3 to 10.

5.0 parts by weight of 2-hydroxy-2-methylpropiophenone as the actinic radiation-sensitive radical polymerization initiator was mixed in 100 parts by weight of the resulting mixture to obtain an optical molding resin composition.

A cube having a side length of 100 mm was produced from the resin composition by a laser beam shaping experiment system comprising a three-dimensional NC (numerically controlled) table having a vessel for the resin composition placed thereon, an argon laser and a controller mainly consisting of an optical system and a personal computer. The molding was free from deformation, had a very high molding accuracy, and further was very excellent in the mechanical strength and the speed of response to the laser beam by virtue of the use of the polyether acrylate as the polyene compound. The molding time was 40 min.

A cone having a bottom diameter of 50 mm, a height of 65 mm and a thickness of 0.5 mm was produced in order to determine its molding time and molding accuracy. Its molding time, accuracy and Izod impact strength were 15 min, 0.38% and 40 kg·cm/cm², respectively.

tor was mixed in 100 parts by weight of the resulting mixture to obtain an optical molding resin composition.

A 1/50 scale model of an automobile was produced from the resin composition by the laser beam shaping experiment system employed in Example 11. The molding was free from deformation, had a very high molding accuracy, and further was very excellent in the mechanical strength and the speed of response to the laser beam by virtue of the use of the polyether acrylate as the polyene compound. The molding time was 3 hr.

The same cone as that of Example 11 was produced in order to compare the molding time and molding accuracy of them. The molding time, the accuracy and the Izod impact strength were 15 min, 0.29% and 40 kg·cm/cm², respectively.

EXAMPLE 13

A polyether acrylate mainly composed of a compound having a structure represented by the formula (21) which had been synthesized from a propylene oxide adduct of ethylenediamine and acrylic acid was mixed as the polyene compound with neopentyl glycol di(β-mercaptopropionate) as the polythiol compound so that the equivalent ratio of the carbon-to-carbon double bond of the polyene compound to the thiol group of the polythiol compound, that is, C=C—/SH—, was 1.0.

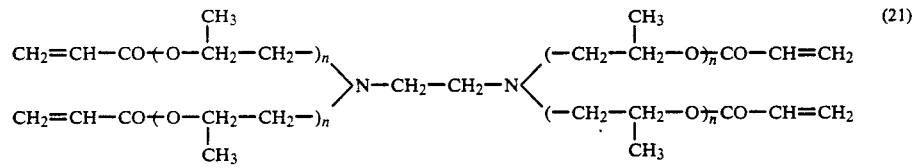

(21)

EXAMPLE 12

A polyether acrylate mainly composed of a compound having a structure represented by the formula (20) which had been synthesized from a propylene oxide adduct of glycerin and acrylic acid was mixed as the polyene compound with trimethylolpropane tristhioglycolate as the polythiol compound so that the equivalent ratio of the carbon-to-carbon double bond of the polyene compound to the thiol group of the polythiol compound, that is, C=C—/SH—, was 1.2.

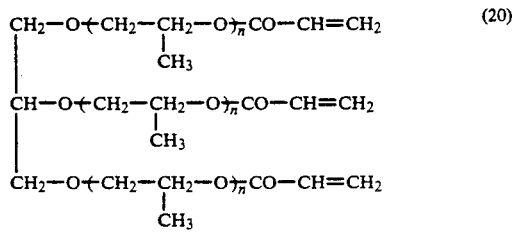

(20)

wherein n is 3 to 10.

5.0 parts by weight of 2-isopropylthioxanthone as the actinic radiation-sensitive radical polymerization initiawherein n is 1 to 5.

5.0 parts by weight of 4,4'-bisdiethylaminobenzophenone as the actinic radiation-sensitive radical polymerization initiator was mixed in 100 parts by weight of the resulting mixture to obtain an optical molding resin composition.

A 1/50 scale model of an automobile was produced from the resin composition by the laser beam shaping experiment system employed in Example 11. The molding was free from deformation, had a very high molding accuracy, and further was very excellent in the mechanical strength and the speed of response to the laser beam by virtue of the use of the polyether acrylate as the polyene compound. The molding time was 3 hr.

The same cone as that of Example 11 was produced in order to compare the molding time and molding accuracy of them. The molding time, the accuracy and the Izod impact strength were 15 min, 0.39% and 45 kg·cm/cm², respectively.

EXAMPLE 14

A polyether acrylate mainly composed of a compound having a structure represented by the formula (22) which had been synthesized from a propylene oxide adduct of sorbitol and acrylic acid was mixed as the polyene compound with neopentyl glycol di(β-mercaptopropionate) as the polythiol compound so that the equivalent ratio of the carbon-to-carbon double bond of the polyene compound to the thiol group of the polythiol compound, that is, C=C—/SH—, was 1.0.

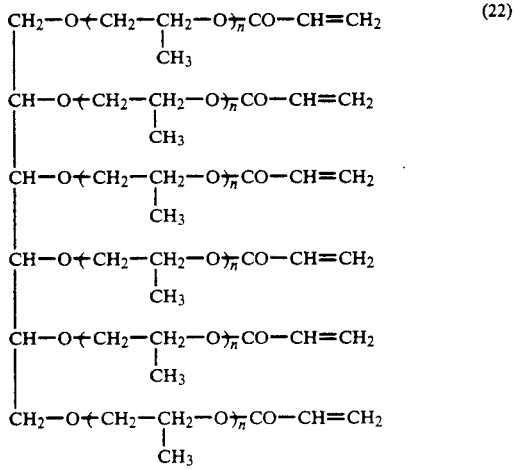

(22)

wherein n is 1 to 10.

5.0 parts by weight of 2-isopropylthioxanthone and 5.0 parts by weight of benzophenone as the actinic radiation-sensitive radical polymerization initiators were mixed in parts by weight of the resulting mixture to obtain an optical molding resin composition.

A 1/50 scale model of a motorcycle was produced from the resin composition by the laser beam shaping experiment system employed in Example 11. The molding was free from deformation, had a very high molding accuracy, and further was very excellent in the mechanical strength and the speed of response to the laser beam by virtue of the use of the polyether acrylate as the polyene compound. The molding time was 3 hr.

The same cone as that of Example 11 was produced in order to compare the molding time and molding accuracy of them. The molding time, the accuracy and the Izod impact strength were 15 min, 0.27% and 42 kg·cm/cm², respectively.

EXAMPLE 15

A polyether acrylate mainly composed of a compound having a structure represented by the formula (23) which had been synthesized from polytetramethyl ether glycol and acrylic acid was mixed as the polyene compound with glycerin tris(β-mercaptopropionate) as the polythiol compound so that the equivalent ratio of the carbon-to-carbon double bond of the polyene compound to the thiol group of the polythiol compound, that is, C=C—/SH—, was 1.0.

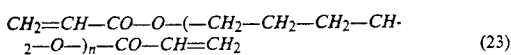

(23)

wherein n is 1 to 10.

5.0 parts by weight of 2-isopropylthioxanthone and 5.0 parts by weight of benzophenone as the actinic radiation-sensitive radical polymerization initiators were mixed in 100 parts by weight of the resulting mixture to obtain an optical molding resin composition.

A 1/50 scale model of a motorcycle was produced from the resin composition by the laser beam shaping experiment system employed in Example 11. The molding was free from deformation, had a very high molding accuracy, and further was very excellent in the mechanical strength and the speed of response to the laser beam by virtue of the use of the polyether acrylate as the polyene compound. The molding time was 3 hr.

The same cone as that of Example 11 was produced in order to compare the molding time and molding accuracy of them. The molding time, the accuracy and the Izod impact strength were 15 min, 0.28% and 50 kg·cm/cm², respectively.

EXAMPLE 16

A polyether acrylate mainly composed of a compound having a structure represented by the formula (24) which had been synthesized from propylene oxide, propylene glycol, trimethylolpropane and acrylic acid was mixed as the polyene compound with glycerin tris(β-mercaptopropionate) as the polythiol compound so that the equivalent ratio of the carbon-to-carbon double bond of the polyene compound to the thiol group of the polythiol compound, that is, C=C—/SH—, was 1.0.

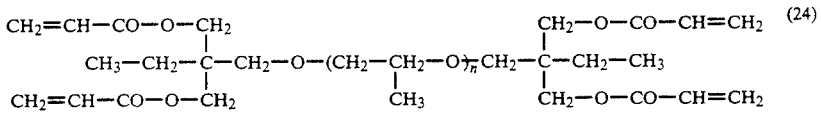

(24)

wherein n is 5 to 20.

5.0 parts by weight of benzophenone as the actinic radiation-sensitive radical polymerization initiator was mixed in 100 parts by weight of the resulting mixture to obtain an optical molding resin composition.

A full-scale model of a telephone was produced from the resin composition by the laser beam shaping experiment system employed in the Example 11. The molding was free from deformation, had a very high molding accuracy, and further was very excellent in the mechanical strength and the speed of response to the laser beam by virtue of the use of the polyether acrylate as the polyene compound. The molding time was 2.3 hr.

The same cone as that of Example 11 was produced in order to compare the molding time and molding accuracy of them. The molding time, the accuracy and the Izod impact strength were 15 min, 0.29% and 47 kg·cm/cm², respectively.

EXAMPLE 17

A polyether acrylate mainly composed of a compound having a structure represented by the formula (25) which had been synthesized from propylene oxide, propylene glycol, adipic acid and acrylic acid was mixed as the polyene compound with glycerin tris(β-mercaptopropionate) as the polythiol compound so that the equivalent ratio of the carbon-to-carbon double bond of the polyene compound to the thiol group of the polythiol compound, that is, C=C—/SH—, was 1.0.

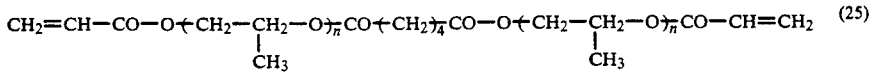

wherein n is 3 to 10.

5.0 parts by weight of benzophenone as the actinic radiation-sensitive radical polymerization initiator was mixed in 100 parts by weight of the resulting mixture to obtain an optical molding resin composition.

A full-scale model of a telephone was produced from the resin composition by the laser beam shaping experiment system employed in Example 11. The molding was free from deformation, had a very high molding accuracy, and further was very excellent in the mechanical strength and the speed of response to the laser beam by virtue of the use of the polyether acrylate as the polyene compound. The molding time was 2.3 hr.

The same cone as that of Example 11 was produced in order to compare the molding time and molding accuracy of them. The molding time, the accuracy and the Izod impact strength were 15 min, 0.33% and 49 kg·cm/cm², respectively.

We claim:

1. An optical molding resin composition comprising (1) one or more polythiol compound and (2) one or more polyene compounds of formulae (II)-(V):

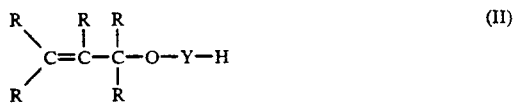

wherein R groups may be the same or different form each other and each represent a hydrogen atom, a phenyl group or an alkyl group having 1 to 10 carbon atoms; and Y represents a group formed by ring opening through the cleavage of the carbon-to-oxygen bond of an epoxy group of one or more epoxy compounds selected form the group consisting of ethylene oxide, propylene oxide, butylene oxide, styrene oxide, cyclohexene oxide, epihalohydrins, and allyl glycidyl ether, wherein only one of such a group is present or a plurality of such groups are arranged in block or at random, with the proviso that Y has at least one group formed by ring opening through the cleavage of the carbon-to-oxygen bond of the epoxy group of the allyl glycidyl ether;

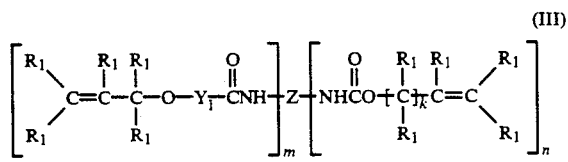

wherein $R_1$ groups may be the same or different from each other and each represent a hydrogen atom, a phenyl group or an alkyl group having 1 to 10 carbon atoms; $Y_1$ represents a group formed by ring opening through the cleavage of the carbon-to-oxygen bond of an epoxy group of one or more epoxy compounds selected from the group consisting of ethylene oxide, propylene oxide, butylene oxide, styrene oxide, cyclohexene oxide, epihalohydrins, and allyl glycidyl ether, wherein only one of such a group is present or a plurality of such groups are arranged in block or at random; Z represents an (m+n)-valet isocyanate-terminated monomer residue having one or more aromatic nuclei, an (m+n)-valet isocyanate-terminated monomer residue having one or more alicyclic nuclei, an (m+n)-valet aliphatic isocyanate-terminated monomer residue, a trimer of the isocyanate-terminated monomer, an isocyanate-terminated prepolymer residue obtained from a hydroxy-terminated saturated polyester polyol and the above-described isocyanate-terminated monomer, an isocyanate-terminated prepolymer residue obtained from hydroxy-terminated saturated polyetherpolyol and the above-described isocyanate-terminated monomer, or an isocyanate-terminated compound residue obtained from the above-described isocyanate-terminated monomer and a polyhydric alcohol; k represents 1 to 10, m represents 1 to 6; n represents an integer of 0 to 5; and (m+n) is an integer of at least 2;

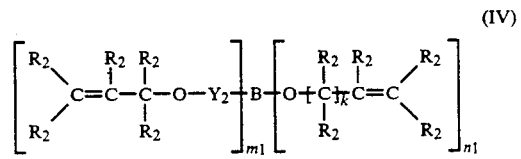

wherein $R_2$ groups may be the same or different from each other and each represent a hydrogen atom, a phenyl group or an alkyl group having 1 to 10 carbon atoms; $Y_2$ represents a group formed by ring opening though the cleavage of he carbon-to-oxygen bond of an epoxy group of one or more epoxy compound selected from the group consisting of ethylene oxide, propylene oxide, butylene oxide, styrene oxide, cyclohexene oxide, epihalohydrins, and allyl glycidyl ether, wherein only one of such a group is present or a plurality of such groups are arranged in block or at random; B represents an ($m_1+n_1$)-valet saturated or unsaturated aliphatic carboxylic acid residue having 4 to 10 carbon atoms and capable of beign bonded to another group through an ester bond, an ($m_1+n_1$)-valet carboxylic acid residue having an aromatic nucleus cable of beign bonded to another group through an ester bond or an ($m_1+n_1$)-valet carboxylic acid residue having an alicyclic nucleus capable of being bonded to another group through an ester bond; k represents 1 to 10; $m_1$ represents 1 to 6; $n_1$ represents an integer of 0 to 5; and ($m_1+n_1$) is an integer of at least 2;

wherein R' represents a hydrogen atom, an l-valet organic residue free from an olefinic double bond and having 1 to 30 carbon atoms which may have an oxygen, nitrogen, sulfur, silicon or halogen atom, or a group derived from a saturated polyesterpolyol having a molecular weight of 100 to 10,000 by removing the hydroxyl groups therefrom; $Y_3$ represents a group formed by ring opening through the cleavage of the carbon-to-carbon bond of an epoxy group of one or more epoxy compounds selected form the group consisting of ethylene oxide, propylene oxide, butylene oxide, styrene oxide, cyclohexene oxide, epihalohydrins, and allyl glycidyl ether, wherein only one such group is present or a plurality of such groups are arranged in block or at random, with the proviso that at least tow groups formed by ring opening though the cleavage of the carbon-to-oxygen bond of the epoxy group of the allyl glycidyl are present in the above general formula; and l represents an integer of 1 to 6, and an actinic radiation-sensitive radical polymerization initiator.

2. The optical molding resin composition of claim 1, further comprising a reactive diluent selected from the group consisting of triallyl cyanurate and triallyl isocyanurate.

3. The optical molding resin composition of claim 1, wherein said actinic radiation-sensitive radical polymerization initiator is selected from the group consisting of ketone compounds, azide compounds, azo compounds, diazo compounds and peroxide compounds.

4. The optical molding resin composition of claim 1, wherein said actinic radiation-sensitive radical polymerization initiator is a ketone compound.

* * * * *

UNITED STATES PATENT AND TRADEMARK OFFICE
CERTIFICATE OF CORRECTION

PATENT NO. : 5 236 967
DATED : August 17, 1993
INVENTOR(S) : Kazuo OHKAWA et al It is certified that error appears in the above-identified patent and that said Letters Patent is hereby corrected as shown below:

Column 25, line 26; change "polythiol compound" to ---polythiol compounds---.
Column 25, line 34; change "form" to ---from---.
Column 25, line 40; change "form" to ---from---.
Column 25, line 68; change "valet" to ---valent---.
Column 26, line 8; change "valet" to ---valent---.
Column 26, line 10; change "valet" to ---valent---.
Column 26, line 16; after "from" insert ---a---.
Column 26, line 35; change "of he" to ---of the---.
Column 26, line 36; change "compound" to ---compounds---.
Column 26, line 42; change "valet" to ---valent---.

UNITED STATES PATENT AND TRADEMARK OFFICE
CERTIFICATE OF CORRECTION

PATENT NO.   : 5 236 967
DATED        : August 17, 1993
INVENTOR(S)  : Kazuo OHKAWA et al It is certified that error appears in the above-indentified patent and that said Letters Patent is hereby corrected as shown below:

```
Column 26, line 44; change "beign" to ---being---.
Column 26, line 45; change "valet" to ---valent---.
Column 26, line 46; change "cable of beign" to ---capable of
          being---.
Column 26, line 48; change "valet" to ---valent---.
Column 26, line 56; change "valet" to ---valent---.
Column 26, line 65; change "form" to ---from---.
Column 27, line  3; change "tow" to ---two---.
Column 27, line  3; change "though" to ---through---.
```

Signed and Sealed this

Twenty-ninth Day of March, 1994

Attest:

BRUCE LEHMAN

Attesting Officer

Commissioner of Patents and Trademarks